June 28, 1960 R. A. BRANNAS 2,942,621
HYDRAULIC LIMIT VALVE
Filed Sept. 10, 1958 2 Sheets-Sheet 2

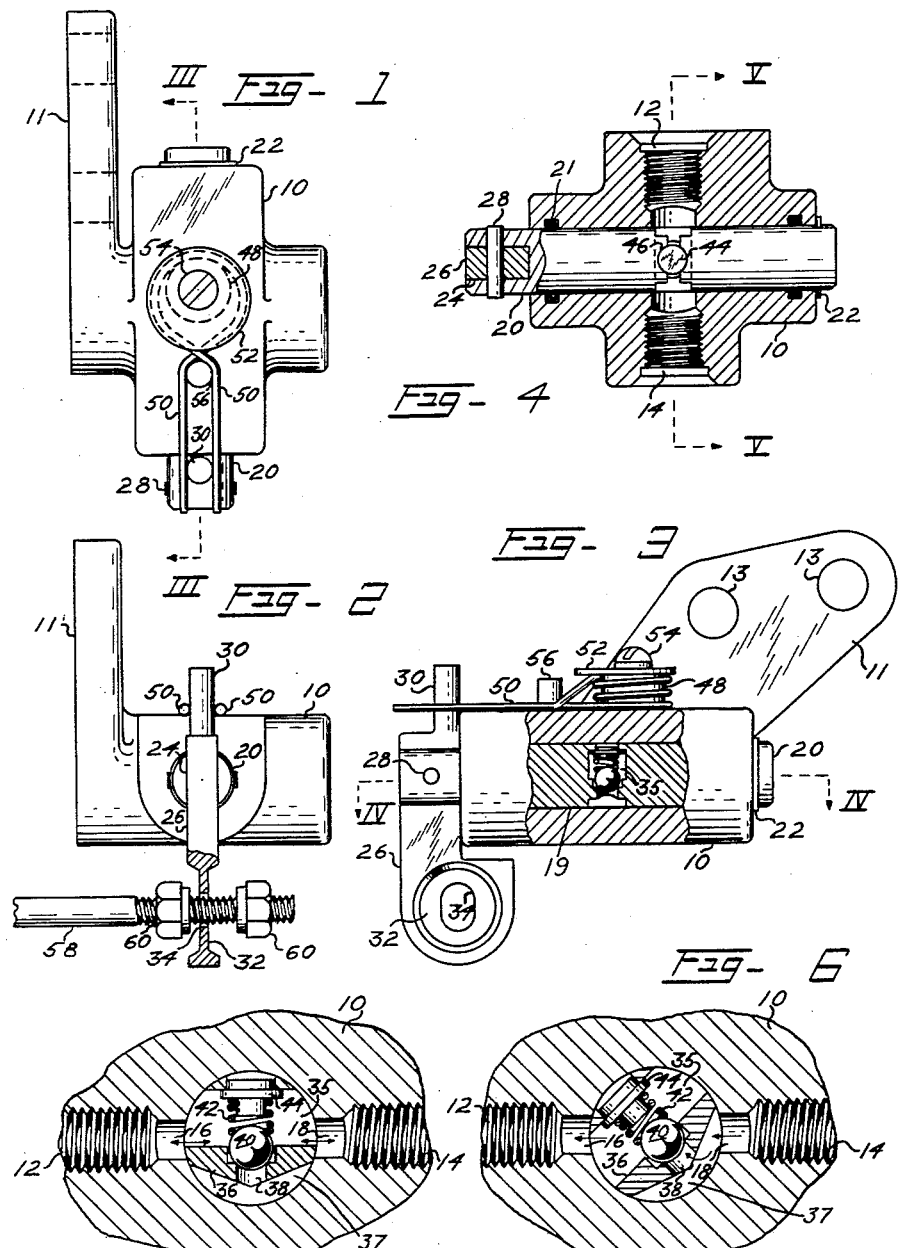

INVENTOR
ROY A. BRANNAS
BY S.J. Rotondi,
A. J. Dupont + R. M. Lyon

United States Patent Office 2,942,621
Patented June 28, 1960

2,942,621

HYDRAULIC LIMIT VALVE

Roy A. Brannas, 523 Detroit Road, Algonac, Mich.

Filed Sept. 10, 1958, Ser. No. 760,278

13 Claims. (Cl. 137—624)

(Granted under Title 35, U.S. Code (1952), sec. 266)

This invention described herein may be manufactured and used by or for the Government of the United States for governmental purposes without the payment to me of any royalty whatever.

This invention relates to hydraulic valves and in particular to a control valve for use with hydraulically operated equipment.

In most hydraulically operated equipment, valves are provided to stop the movement of the equipment or some portion thereof. Oftentimes, it is desirable to limit the travel of the equipment within predetermined intervals. Examples of such equipment would be cranes, booms, elevating mechanisms of cannons and numerous others. In such applications, reversal of movement of the equipment is accomplished through reversal of the direction of flow of the actuating hydraulic fluid. Accordingly, a dual aspect problem is posed. A means must be provided which will not only provide for stopping the flow in one direction so as to limit movement in one direction, but which will allow the flow of fluid in the opposite direction to reverse the direction of movement of the driven equipment. Past devices for solving such a problem have resulted in complex structures or have required manual intervention.

By utilizing a new rotary valve member, applicant has solved the problem in a simple and efficient manner. Briefly, a rotary valve member is provided which allows flow in either direction when in a neutral position, and, when rotated from this neutral position, cuts off flow in one direction while allowing flow in the other direction without first returning the valve member to the neutral position.

It is therefore an object of this invention to provide a control valve for hydraulically operated equipment.

It is also an object of this invention to provide a hydraulic valve for limiting movement of hydraulically operated equipment within predetermined limits.

Another object of this invention is to provide a control valve which stops the flow of hydraulic fluid in one direction while allowing reverse flow of fluid without changing position of the operating valve member.

Other objects and advantages of this invention will be apparent from the following description and drawings:

Fig. 1 is a top view of the valve.

Fig. 2 is a front view of the valve also showing the connecting mechanism.

Fig. 3 is a partial sectional view taken along line III—III of Fig. 1.

Fig. 4 is a sectional view taken along line IV—IV of Fig. 3.

Fig. 5 is a partial sectional view taken along line V—V of Fig. 4 and showing the rotary valve member in the neutral position.

Fig. 6 is a partial sectional view similar to Fig. 5 showing the rotary valve member in a cut-off position.

Figure 7:
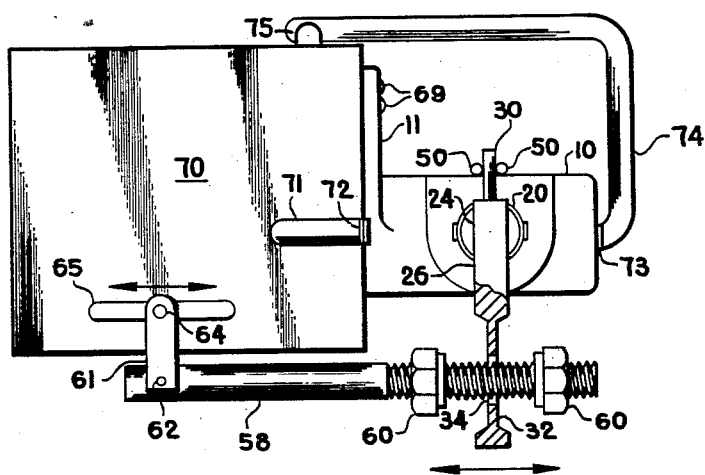
Figure 7 is a front view illustrating the valve in combination with hydraulically operated equipment.

Referring to the drawings, the valve comprises a casing or housing 10 having a mounting flange 11 with bores 13 so that the valve can be mounted in any conventional manner such as bolts and nuts. Within the housing 10 are ports 16 and 18 which act alternately as both inlet and outlet ports. These ports are threaded at 12 and 14, respectively, for attachment to a hydraulic line.

Perpendicular to the axis of the ports 16 and 18 is bore 19 in which is a cylindrical rotary valve plug member 20. Any conventional type sealing means are used around member 20 such as sealing rings 21. Member 20 extends past housing 10 at both ends. A washer or snap ring 22 at one end prevents displacement of plug member 20 from bore 19. At the other end of member 20 is slot 24 in which actuating lever 26 is held by pin 28. Movement of lever 26 thereby results in rotation of valve member 20.

In its preferred form lever 26 has a dished-out portion 32 through which portion is an elongated passage or slot 34. Actuating rod 58 extends through this slot and is threaded to accommodate a pair of adjustable stops 60 placed on opposite sides of lever 26. These stops may be conventional nuts which can be screwed on the threaded portion of rod 58.

Rod 58 in turn is connected to the moving portion of the hydraulically operated equipment. As shown in Figure 7, bracket 11 of valve housing 10 may be mounted by conventional means such as screws 69, to the housing of the hydraulically operated equipment indicated for illustration purposes in block form in Figure 7 by numeral 70. Elbowed conduit segment 71 of the equipment hydraulic fluid flow line extending through housing 70 may be suitably connected as by coupling 72 in fluid communication with port 16 (not shown). Similarly, equipment hydraulic line conduit segment 74 elbowed as at 75 and extending through housing 70 may be suitably connected in fluid communication with port 18 (not shown) as by coupling 73. Thus, valve 20 shown in Figure 7 in the neutral position may be positioned in the hydraulic line of the hydraulically operated equipment. Rod 58 is connected as heretofore mentioned to a moving portion of the equipment for relative movement therewith. For illustration purposes only, this moving portion as shown in Figure 7 is in the form of arm 61 fixedly secured normal, to rod 58 as by bolt 62 and is fixedly secured normal to pin 64 at the other end thereof. Pin 64 plays in slot 65 of housing 70. Within housing 70 pin 64 is operably connected to the hydraulic line fluid flow reversing mechanism (not shown) and is movably responsive thereto for proper operation of valve 20. Thus, as shown by the arrows, movement imparted to pin 64 in either direction by the hydraulic line fluid flow reversing mechanism moves arm 61 and rod 58 in the same direction. It is to be understood that the hydraulic line fluid flow reversing mechanism and pin 64 are synchronized so that valve 20 is moved in the correct direction for proper operation thereof. Operation of the equipment thereby results in movement of rod 58. Movement of rod 58 to the right, as shown in Fig. 2, will eventually result in contact between stop 60 and dished-out portion 32. Further movement of rod 58 thereafter causes lever 26 to pivot about the axis of valve plug 20, which also rotates about such axis.

Plug 20 has a passage 35 therethrough which normally communicates with ports 16 and 18 when in the neutral position. In this position fluid can flow in either direction. Below and parallel to passage 35 is a recess 37 which is separated from passage 35 by portion 36 of valve plug 20. Portion 36 has sides tapering toward passage 35. Bore 38 in portion 36 joins passage 35 and recess 37. A seat for ball 40 is also formed in portion 36. Ball 40 normally closes off bore 38 through the action of spring 42 which is held in place by spring seat 44.

As rod 58 moves to the right and lever 26 is moved in a counterclockwise direction, valve member 20 rotates in a counterclockwise direction from its original neutral position as shown in Fig. 5 to the position in Fig. 6, the original direction of fluid flow being from port 16 to port 18, port 16 serving as an inlet. As valve member 20 rotates counterclockwise to a position shown in Fig. 6, the fluid flow from port 16 is stopped and operation of the equipment ceases. Flow in this direction is stopped as passage 35 no longer is in communiction with both ports and ball 40 seated by spring 42 and hydraulic pressure prevents flow through bore 38.

To reverse the direction of movement of the hydraulically operated equipment, the valve member 20 need not be returned to the neutral position shown in Fig. 5. Reversal of the equipment takes place by reversal of the direction of flow of fluid which can take place without returning member 20 to the neutral position as flow will occur through port 18, recess 37 and bore 38, displacing ball 40 against the action of spring 42 and exiting through port 16.

As the fluid flow causes reversal of the direction of the hydraulically operated equipment, rod 58 moves in the opposite direction tending to remove contact of one stop 60 with portion 32 of lever 26. As this contact tends to be removed a means is provided for maintaining this contact until the valve member 20 is returned to the neutral position without interrupting the flow of fluid. This is accomplished by the use of a portion 30 of lever 26 which extends past housing 10. This portion 30 is normally urged to the neutral position by means of spring 48 having prongs 50. This portion 30 can be either an integral extension of the lever 26 or a pin fixed to the lever. When lever 26 is moved out of the neutral position by either of the stops 60, portion 30 moves against the action of one of the prongs 50, the other prong remaining stationary due to fixed pin 56, which prevents rotation of spring 48. Spring 48 is held to the housing 10 by means of washer 52 and screw 54. When contact of lever 26 and one of the stops 60 tends to be removed, prong 50 will force portion 30 and thereby lever 26 to maintain such contact until valve 20 is returned to the neutral position. The valve member 20 and lever 26 remains in this position until movement of rod 58 in the opposite direction results in contact of the second stop 60 with portion 32. At this time, valve member 20 and lever 26 are then rotated clockwise against the action of the other prong 50 of spring 48 until flow of fluid in this direction is cut off in a manner identical to that previously explained.

Maintaining contact of the lever 26 with the stop 60 is necessary to prevent inadvertent shifting of the valve member, by surges of fluid pressure, prior to contact with the alternate stop. Surges of fluid pressure will set up forces tending to rotate the valve 20. If contact were not retained such rotation would take place at random and haphazardly. If the surges of fluid pressure were of a sufficient magnitude, the valve 20 might possibly be rotated sufficiently to cut off the flow of fluid before the predetermined limit set by the alternate stop. The spring 48 having prongs 50 thereby acts in a dual capacity; that of preventing haphazard rotation of valve 20 which would result in less efficient and less accurate operation and that of returning the valve 20 to the neutral position. Once in the neutral position the valve 20 is less subject to sudden surges as the force of spring 48 tends to maintain the valve in such neutral position.

By adjusting the position of stops 60 on rod 58, movement of the hydraulically operated equipment can be limited to any preselected range. In addition, movement of the equipment can be reversed without the necessity of returning the valve member 20 to a neutral position. However, as the flow of fluid through the valve is much more direct through ports 16 and 18 and passage 35, provision has been made to return the valve member to the neutral position. This is done with a minimum of interference with the flow of fluid. In certain applications this valve may be used in conjunction with a high pressure pilot operated selector valve for extreme high pressures.

While various modifications may be resorted to and will be apparent to those skilled in the art, it is understood that the invention is not to be limited to the preferred form described herein, except as limited by the scope of the appended claims.

I claim:

1. A control valve device for regulating a fluid powered system having a source of fluid power and equipment to be operated thereby, said equipment having a movable member, said valve device comprising: a housing having inlet and outlet ports, a rotary valve member in said housing and having a passage therein, said passage being communicable with said ports for fluid flow therethrough in a first direction when said valve member is in a first position and being communicable with at least one of said ports for fluid flow therethrough in a second reverse direction when said valve member is in a second position, said valve member including means for permitting fluid flow through said passage in said second reverse direction and for preventing fluid flow through said passage in said first direction when in said second position and means for rotating said valve member to said positions operably connectable to said equipment movable member whereby operation of said valve member is responsive to movement of said movable element.

2. A control valve as defined in claim 1 and further comprising means in said passage providing for flow of fluid in a second reverse direction when said valve member is in said second position thereby providing for reverse operation of said equipment.

3. A control valve as defined in claim 1 in which said means for rotating said rotary valve member comprises a lever attached to said rotary valve member extending transverse to the axis thereof and a connection for operably connecting said lever to said equipment movable element.

4. A control valve as defined in claim 1 including a rod attachable to said movable element and movable therewith, a lever attached to said rotary valve member, and means on said rod for transmitting the movement of said element and rod to said lever so that rotation of said valve member is responsive to operation of said equipment.

5. A control valve as defined in claim 1 including a lever attached to said rotary valve member, a rod attachable to said movable element and movable therewith, and a stop on said rod for engaging said lever and for transmitting movement of said rod to said lever.

6. A control valve as defined in claim 1 including a lever on said rotary valve member having a slot formed therein, a rod having an end extending through said slot, and means for transmitting movement of said rod to said lever comprising a pair of stops on said rod, said stops being positioned on opposite sides of said lever for contacting said lever on movement of said rod thereby moving said lever.

7. A control valve as defined in claim 6 and further comprising spring means mounted on said housing and engaging said lever, said spring means biasing said lever towards said first position thereby maintaining contact of said lever with one of said stops when said lever is in a position other than said first position.

8. A control valve as defined in claim 1 including a lever on said rotary valve member and having a slotted end, a rod having a threaded end extending through said slotted end, and a pair of threaded nuts as stops on said threaded end, the position of said nuts on said rod thereby limiting the movement of said rod by controlling the contact of said nuts with said lever and thereby controlling rotation of said valve member so as to control the flow of fluid causing operation of said equipment and movement of said rod.

9. A control valve as defined in claim 1 and further comprising spring means mounted on said housing for biasing said means for rotating said valve member towards said first position.

10. A control valve for regulating a fluid powered system having a source of fluid power and equipment to be operated thereby, said equipment having a movable element; said control valve comprising a housing having inlet and outlet ports therein, a rotary valve member in said housing and having a passage therein communicating with both of said ports when in a first position thereby allowing flow of fluid in a first direction and communicating with only one of said ports when in a second position thereby preventing flow of fluid in said first direction, said rotary valve member further having a recess therein parallel to and below said passage, a bore connecting said recess and said passage, and means providing flow of fluid in a reverse direction including a check valve in said bore operably preventing flow of fluid through said passage when said rotary valve member is in said first position and allowing flow of fluid in said reverse direction through said bore and recess when said rotary valve member is in said second position, said rotary valve member being connectable to and thereby responsively operable to movement of said movable element of said equipment.

11. A control valve as defined in claim 10 in which said check valve comprises a spring biased ball in said first passage normally closing said bore, a seat for said ball formed in said bore, said ball being unseated by reverse flow of fluid through said valve.

12. A control valve as defined in claim 10 wherein said recess has sides tapered towards said passage.

13. In a fluid powered system having a source of fluid power and equipment including a movable element to be operated thereby, a connected valve comprising a housing having inlet and outlet ports, a rotary valve member in said housing and having a passage therein, said passage being communicable with said ports for fluid flow therethrough in a first direction when said valve member is in a first position and being communicable with said ports for fluid flow therethrough in a second reverse direction when said valve member is in a second position, said valve member including means for permitting fluid flow through said passage in said second reverse direction and for preventing fluid flow through said passage in said first direction when in said second position, means for rotating said valve member to said positions and means for operably connecting said means for rotating said rotary valve member to said equipment movable element, whereby operation of said valve member is responsive to movement of said movable element of said equipment.

References Cited in the file of this patent
UNITED STATES PATENTS

| | | |
|---|---|---|
| 373,259 | Whittier | Nov. 15, 1887 |
| 590,691 | Stevenson | Sept. 28, 1897 |
| 1,290,265 | McEntire | Jan. 7, 1919 |
| 2,167,929 | Johnson | Aug. 1, 1939 |
| 2,196,522 | Davis | Apr. 9, 1940 |